United States Patent
Hartman et al.

(10) Patent No.: US 11,893,445 B2
(45) Date of Patent: Feb. 6, 2024

(54) SYSTEM, DEVICE, AND METHOD FOR SECURING REMOVABLE CARDS WITH VARYING MECHANICAL GEOMETRY

(71) Applicant: Dell Products L.P., Round Rock, TX (US)

(72) Inventors: Corey Dean Hartman, Hutto, TX (US); Eduardo Escamilla, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 148 days.

(21) Appl. No.: 17/720,926

(22) Filed: Apr. 14, 2022

(65) Prior Publication Data

US 2023/0334270 A1 Oct. 19, 2023

(51) Int. Cl.
   *G06K 7/00* (2006.01)
(52) U.S. Cl.
   CPC ................. *G06K 7/0056* (2013.01)
(58) Field of Classification Search
   CPC .................................................. G06K 7/0056
   See application file for complete search history.

(56) References Cited

U.S. PATENT DOCUMENTS

| | | | | |
|---|---|---|---|---|
| 5,793,614 A | * | 8/1998 | Tollbom | H05K 7/1409 361/801 |
| 6,185,106 B1 | * | 2/2001 | Mueller | H05K 7/1409 361/801 |
| 7,593,238 B2 | * | 9/2009 | Tang | G06F 1/186 361/801 |
| 9,497,871 B2 | * | 11/2016 | Butterbaugh | H05K 7/18 |
| 11,163,342 B1 | * | 11/2021 | Lin | G06F 3/016 |
| 11,429,160 B2 | * | 8/2022 | Tseng | G06F 1/185 |

* cited by examiner

*Primary Examiner* — Seung H Lee
(74) *Attorney, Agent, or Firm* — Womble Bond Dickinson (US) LLP

(57) ABSTRACT

Methods, systems, and devices for providing computer implemented services are disclosed. To provide the computer implemented services, the quantity of hardware resources available may be modified. The quantity of hardware resources may be modified by adding removable cards. When the removable card is added, a retention element may be used to secure the removable card in place. The retention element may be adaptable to allow for removable cards of varying topology to be secured. The retention element may secure the removable cards automatically or in response to user intervention.

20 Claims, 18 Drawing Sheets

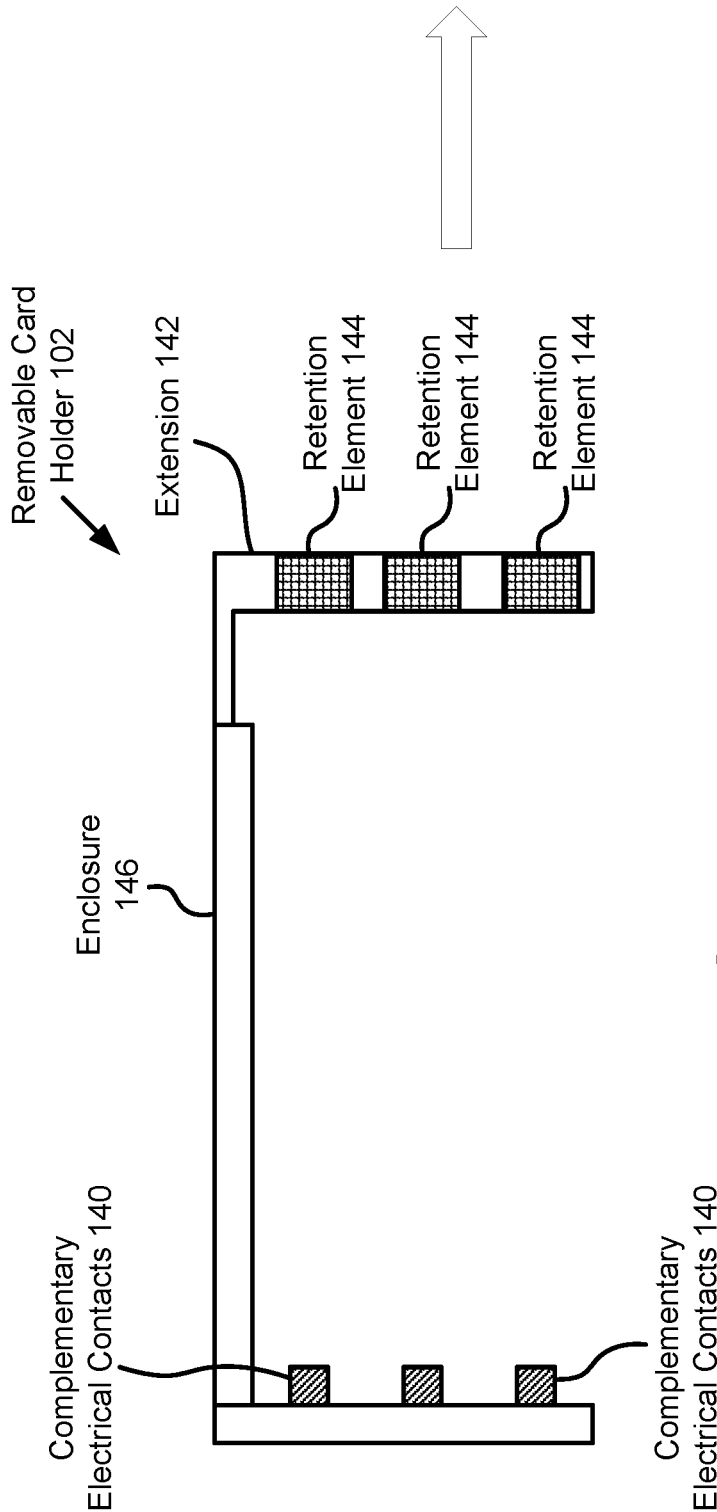

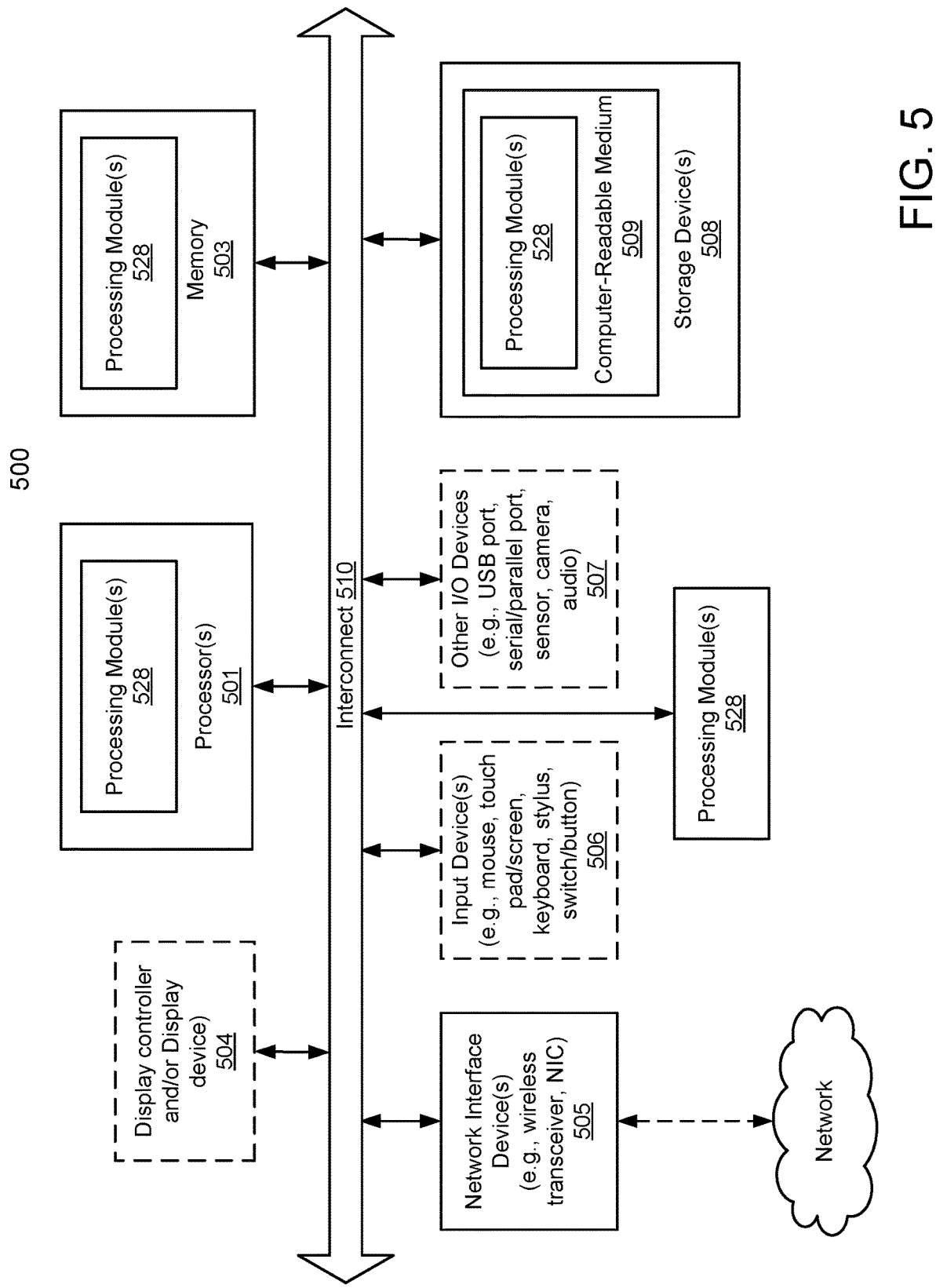

SYSTEM, DEVICE, AND METHOD FOR SECURING REMOVABLE CARDS WITH VARYING MECHANICAL GEOMETRY

FIELD DISCLOSED HEREIN

Embodiments disclosed herein relate generally to device management. More particularly, embodiments disclosed herein relate to systems and methods to secure devices in data processing systems.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

FIGS. 4A-4F show diagrams illustrating interactions between and actions of components of a system in accordance with an embodiment.

FIG. 5 shows a block diagram illustrating a computing device in accordance with an embodiment.

DETAILED DESCRIPTION

Figure 1A:
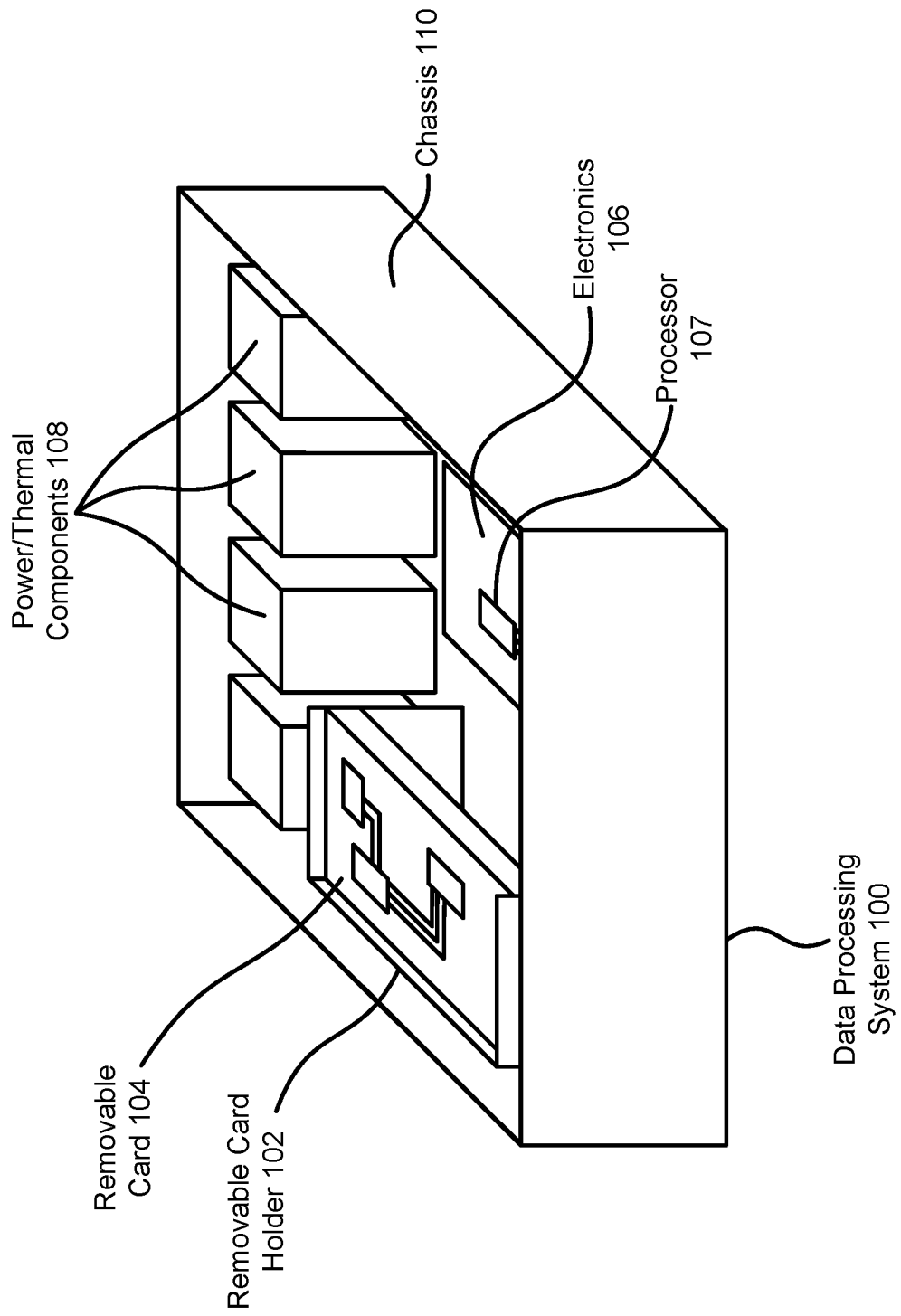
FIG. 1A shows a diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services. The computer implemented services may include any quantity and type of such services.

To provide the computer implemented services, one or more of the data processing systems may be utilized. The type and quantity of service provided by the data processing systems may be limited based on the hardware resources available to the data processing systems.

To provide flexibility with respect to the available hardware resources, the data processing systems may include removable card holders usable to add hardware resources to the data processing systems. To do so, removable cards may be inserted into the removable card holders which may operably connect the hardware resources of the removable cards to other hardware resources of the data processing system, thereby allowing for increase hardware resource availability.

To improve the likelihood of the hardware resources of the removable cards being available, the removable card holders may include one or more retention elements. The retention elements may be usable to secure removable cards in removable card holders, which may improve the likelihood of forming and maintaining electrical connections used for forming operable connections between the removable cards and other components of the data processing systems.

The retention elements may be adaptable to allow a range of removable cards to be secured. For example, retention elements may adapt their form and structure to be complementary to the form and/or structure of portions of removable cards.

For example, in peripheral component interconnect express (PCIe) device implementation of a removable card, the edges of cards may have varying topology which may or may not comply with various standards. If the varying topology is not taken into account, mechanical features otherwise usable to secure removable cards may apply forces to the removable cards that tend to warp/damage/degrade the removable cards and/or may reduce the likelihood of formation of operable connections (e.g., due to misalignment of electrical contacts).

Thus, embodiments disclosed herein may provide an improved data processing device that is more adaptable to a range of removable card topologies and that may be more likely to be secured. Consequently, the likelihood of forming operable connections necessary for use and operation of the removable cards may be improved.

In an aspect, a data processing system in accordance with an embodiment is provided. The data processing system may include a processor; and a removable card holder may include: electrical contacts operably connected to the processor, the electrical contacts being adapted to contact complementary electrical contacts of a removable card while the removable card is positioned in the removable card holder to form an operable connection between the processor and the removable card; an extension adapted to restrict movement of the removable card away from the electrical contact while the removable card is positioned in the removable card holder; and a retention element positioned with the extension, the retention element adapted to: engage an edge of the removable card when the removable card comprises the edge and the extension restricts movement of the removable card, and retract away from the removable card when the removable card does not comprise the edge.

The retention element may include a slot that restricts movement of the removable card while the retention element engages the edge of the removable card.

The slot may restrict movement of the removable card in a first direction, the extension may restrict movement of the removable card away from the electrical contact in a second direction, and the first direction and the second direction are different directions.

The retention element may also include a compressible pad (e.g., a sheet) positioned between the slot and the extension, the compressible pad being adapted to expand when the removable card comprises the edge and contract when the removable card does not comprise the edge.

The retention element may further include a sliding element coupled to the slot, the sliding element being adapted to move the slot between a first position in which the retention element is extended toward the removable card and a second position in which the retention element is retracted away from the removable card.

The retention element may also include a second slot that restricts movement of a second removable card while the second slot engages an edge of a second removable card positioned in the card holder.

The edge may include a portion of circuit card of the removable card, the complementary electrical contacts being positioned on a second portion of the circuit card.

The extension may be movable between two positions, while in a first position of the two positions the extension presses the retention element against the removable card positioned in the removable card holder and while in a second position of the two positions the extension holds the retention element away from the removable card positioned in the removable card holder.

Pressing the retention element against the removable card may assist in maintaining the contact between the electrical contacts and the complementary electrical contacts.

The extension may include a plate, the retention element may be moveably coupled to the plate between two positions, in a first position of the two positions the retention element is closer to the electrical contacts than in a second position of the two positions.

In an aspect, a method for operating a removable card is provided.

In an aspect, a removable card is provided, as discussed above.

Turning to FIG. 1A, a diagram illustrating a system in accordance with an embodiment is shown. The system may provide computer implemented services. To provide the computer implemented services, the system may include data processing system 100.

Data processing system 100 may include functionality to provide various types of computer implemented services. The computer implemented services may include any number and type of computer implemented services. Computer implemented services may include, for example, database services, data processing services, electronic communication services, and/or any other services that may be provided using one or more computing devices. Other types of computer implemented services may be provided by data processing system 100 without departing from embodiments disclosed herein.

To provide the computer implemented services, data processing system 100 may include various components such as electronics 106 and power/thermal components 108. Electronics 106 may include various types of hardware components such as processors (e.g., 107), memory modules, storage devices, communications devices, and/or other types of devices. Any of these hardware components may be operably connected to one another using circuit card traces, cabling, connectors, etc.

Power/thermal components 108 may power to any of the components of data processing systems 100 and/or thermally mange any of the components of data processing systems 100. For example, power/thermal components 108 may include power supplies, fans, and/or other types of devices usable to power and/or thermally manage the components.

To provide different types of computer implemented services, various types of computing resources (e.g., provided by hardware devices) may be utilized. Consequently, the computing resources of a data processing system may vary depending on how the system is used. For example, to provide database services, data processing system 100 may utilize large amounts of storage resources (which may be provided by storage devices such as solid state drives or other types of storage devices). In contrast, to provide instant messaging services, data processing system 100 may utilize large amounts of communication resources (which may be provided by communications devices such as network interface cards).

To facilitate flexibility in the available computing resources, data processing system 100 may include removable card holder 102. Removable card holder may facilitate interconnection of various removable cards (e.g., 104) to electronics 106. While interconnected via removable card holder 102, a removable card (e.g., 104) may contribute its computing resources for the performance of various tasks managed by electronics 106. Consequently, the computing resources of a data processing system may be modified be adding and/or removing removable cards to a removable card holder 102.

For example, removable card 104 may be operably connected to processor 107. Processor 107 may task the removable card with performing various functions that may be used by processor 107 in providing various computer implemented services. However, at other points in time processor 107 may be tasked with providing other services that do not need the resources provided by removable card 104. In such a scenario, removable card 104 may be removed and other removable cards may be inserted into removable card holder 102.

In an embodiment, removable card holder 102 is implemented as a peripheral component interconnect express (PCIe) device cage or other type of structure for holding various devices that host various hardware components that may contribute computing resources to a data processing system. A device cage may be physical structure that bounds a volume in which removable cards may be positioned. In FIG. 1, removable card holder 102 is illustrated with an open top side. However, a removable card holder may include any number of walls that bound a space in which any number of removable cards may be positioned. When so positioned, removable card holder 102 may operably connect the removable cards to electronics 106 and/or other components.

For example, removable card holder 102 may include one or more electrical connectors (which may include any number of electrical contacts such as circuit card pads) which may electrical connections to removable cards (e.g., using complementary electrical connectors on the removable cards) positioned in removable card holder 102. The electrical connectors of removable card holder 102 may be operably connected to electronics 106 (e.g., via traces, cabling, etc.) thereby facilitating operable connection between removable cards positioned in removable card holder 102 and various other components of data processing system 100.

Removable cards may be implemented with physical devices that include any number of hardware components. When positioned in removable card holder 102, one or more of the hardware components of the removable card may be operably connected to electronics 106 (or a portion thereof) and/or other devices. As noted above, the removable cards may include complementary connectors that allow for formation of operable connection.

However, misalignment of the complementary connectors of the removable cards with the electrical connectors of removable card holder 102 may, for example, prevent the formation of desired operably connections, result in the generation of undesired operable connections, may place undesired levels of physical stress on the electrical contacts, and/or may result in other undesirable impacts.

In general, embodiments disclosed herein relate to systems, methods, and devices for improving the likelihood of forming and/or maintaining desired operable connections. To do so, embodiments disclosed herein may facilitate alignment of removable cards (or more specifically, complementary electrical contacts) with removable card holders (or more specifically, electrical contacts). By facilitating alignment of removable cards with removable card holders, it may be more likely that desired operable connections be formed and/or maintained.

Figure 1B:
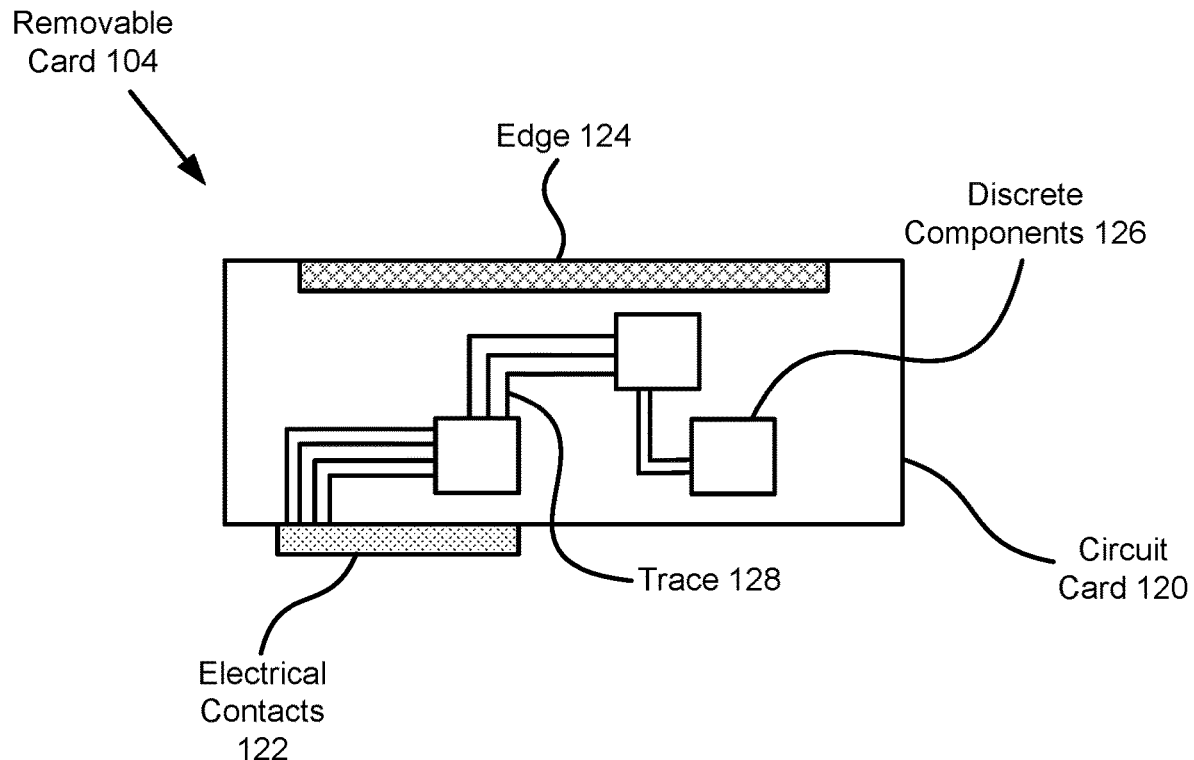
FIG. 1B shows a top view diagram illustrating a removable card in accordance with an embodiment.
Figure 1C:
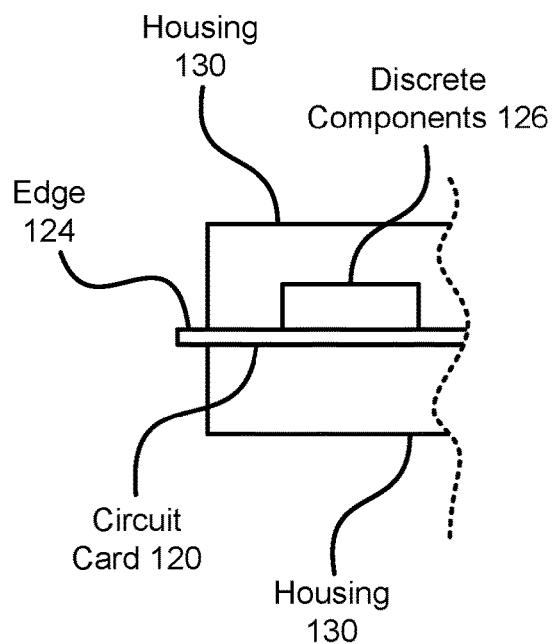
FIG. 1C shows a side view diagram illustrating a removable card in accordance with an embodiment.
Figure 1D:
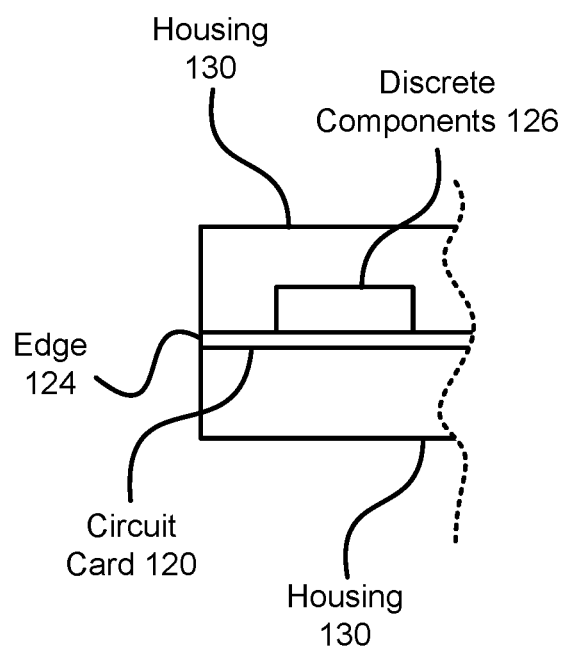
FIG. 1D shows a side view diagram illustrating a removable card in accordance with an embodiment.

To improve the likelihood of forming and/or maintaining desired operable connections, a system in accordance with embodiments disclosed herein may include removable card holders that include one or more adaptable features for positioning removable card holders. The one more adaptable features may facilitate positioning of removable cards that may have varying physical geometries. The adaptable features may allow removable card holder 102 to position different removable cards having different geometries. Consequently, a data processing system in accordance with embodiments disclosed herein may have improved flexibility with respect to the types of removable cards that may be utilized with it as well as improving the likelihood of forming and/or maintaining desired operable connections. Refer to FIGS. 1B-1D for additional details regarding removable cards, and FIGS. 1E-1O for additional details regarding removable card holders in accordance with embodiments disclosed herein.

While illustrated in FIG. 1A with a limited number of specific components, a system may include additional, fewer, and/or different components without departing from embodiments disclosed herein.

Turning to FIG. 1B, a diagram illustrating removable card 104 in accordance with an embodiment is shown. As discussed above, removable card 104 may contribute computing resources (e.g., by performing operations) to a data processing system when positioned in a removable card holder.

To provide computing resources, removable card 104 may include circuit card 120 and any number of discrete components 126. Discrete components 126 may include, for example, packaged integrated circuits (e.g., "computer chips"), individual components such as resistor or capacitors, and/or other types of hardware components. Circuit card 120 may include traces 128 that interconnect (e.g., electrically) any of discrete components 126 and electrical contacts 122. While illustrated in FIG. 1B with an example topology, a removable card may include different types and/or arrangements of discrete components and electrical contacts 122, and/or different interconnection topologies facilitated by traces.

In an embodiment, removable card 104 is implemented as a PCIe card. The PCIe standard may define various standards that removable card 104 meet including, for example, the structure and positioning of electrical contacts 122 and dimensional limitations on removable cards 104. The PCIe standard may also specify, for example, a geometry of edge 124 (e.g., a "north edge"). Edge 124 may be on a side of removable card holder 102 opposite of electrical contacts 122.

To position removable card 104 in a removable card holder, edge 124 may be utilized. For example, edge 124 may be positioned in a plane in which the complementary electrical contacts of a removable card holder are positioned. Edge 124 may be positioned in this plane to improve the likelihood of alignment between electrical contacts 122 and complementary contacts of a removable card holder.

To position edge 124, a removable card holder may be adaptable so that it may mechanically interface with various geometries of edge 124. For example, depending on implementation, edge 124 may include different mechanical features. Refer to FIGS. 1C-1D for additional details regarding edge 124.

Positioning edge 124 may also, for example, prevent or reduce the likelihood of electrical contacts 122 from moving with respect to complementary contacts of a removable card holder in response to mechanical force. For example, if a data processing system that includes removable card 104 positioned in a removable card holder is dropped, the resulting mechanical forces applied upon impact with the ground may tend to dislodge removable card 104 from the removable card holder. The removable card holder may include one or more mechanical features that retain the position of edge 124 in response to mechanical forces thereby reducing the likelihood of dislodgement (partial or total) of removable card 104.

While illustrated in FIG. 1B with a limited number of specific components, a removable card may include additional, fewer, and/or different components without departing from embodiments disclosed herein.

As discussed above, removable card 104 may include an edge having different geometries. FIGS. 1C-1D illustrate example of various geometries of edge 124.

Turning to FIG. 1C, a first diagram of a portion of removable card 104 in accordance is shown. In FIG. 1C, the view point may be from the left hand side of FIG. 1B, looking towards removable card 104.

As seen in FIG. 1C, edge 124 may include a portion of circuit card 120 (or another structures) that extends outward (e.g., to the left in FIG. 1C), away from housing 130 (not shown in FIG. 1B). Consequently, edge 124 may have a profile that includes a raised portion (e.g., the portion of circuit card 120 extending past housing 130).

While not illustrated in FIG. 1B, removable card 104 may include housing 130. Housing 130 may be implemented with a shell, walls, and/or other structures that partially or totally surround discrete components 126 and/or circuit card 120. Housing 130 may provide a degree of physical protection to these components, may guide airflow proximate to these components, and/or may perform other functions.

Turning to FIG. 1D, a second diagram of a portion of removable card 104 in accordance is shown. In FIG. 1D, the view point may be from the left hand side of FIG. 1B, looking towards removable card 104 (e.g., similar to that in FIG. 1C.

As seen in FIG. 1D, edge 124 may include a portion of circuit card 120 (or another structures) that aligns with housing 130 (not shown in FIG. 1B). Consequently, edge 124 may have a profile that does not include a raised portion as discussed with respect to FIG. 1C. In contrast, the profile of edge 124 may be flat.

Likewise, while not illustrated in FIG. 1B, removable card 104 may include housing 130. Housing 130 may be implemented with a shell, walls, and/or other structures that partially or totally surround discrete components 126 and/or circuit card 120. Housing 130 may provide a degree of physical protection to these components, may guide airflow proximate to these components, and/or may perform other functions.

As seen in FIG. 1D, housing 130 and circuit card 120 may align (e.g., along the left hand side of the figure) thereby presenting a substantially flat face as edge 124 (or at least may not include a raised portion). In contrast, edge 124 as illustrated in FIG. 1C may present a non-uniform face with a raised portion.

These differences in profiles may present challenges in positioning various removable cards in removable card holders. For example, if it is presumed that all removable cards may have a profile as illustrated in FIG. 1C, a retention element designed to secure only that type of profile may not be able to retain an edge having a profile as illustrated in FIG. 1D. To address these challenges, a removable card holder in accordance with embodiments disclosed herein may include functionality to adapt its shape to complement a profile of an edge of a removable card. By doing so, the removable card holder may be capable of securing the edges of removable cards regardless of the geometry of an edge of the removable card.

Figure 1E:
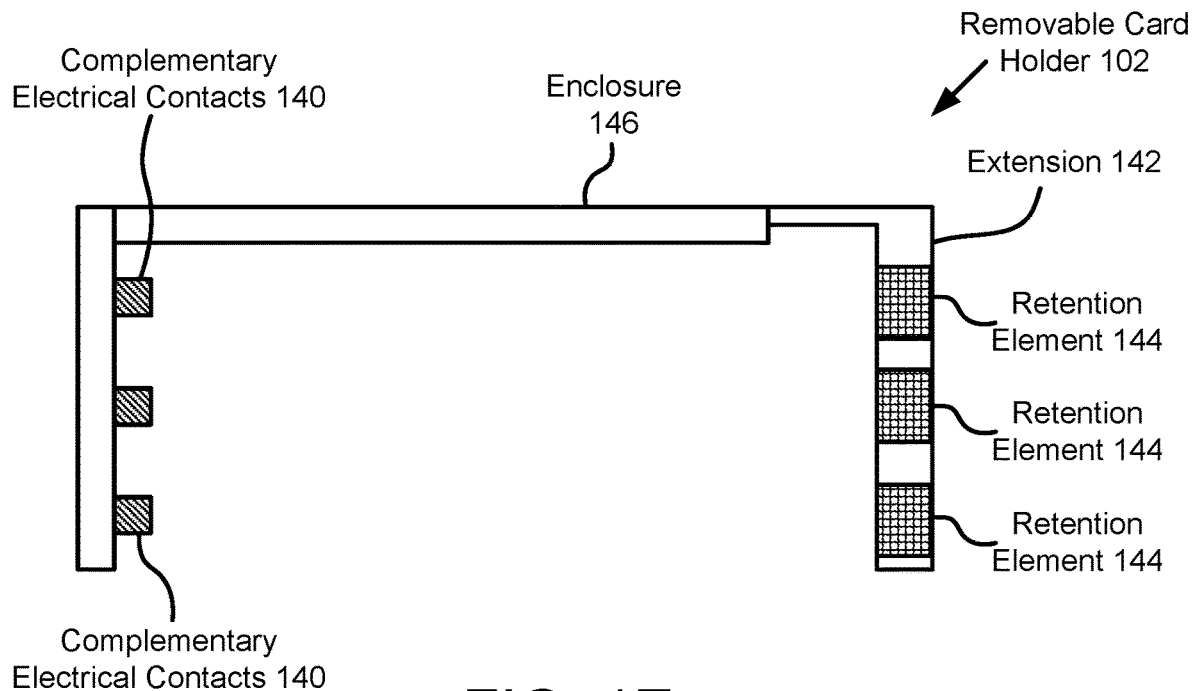
FIG. 1E shows a side view diagram illustrating a removable card holder in accordance with an embodiment.

Turning to FIG. 1E, a diagram of removable card holder 102 in accordance with an embodiment is shown. In FIG. 1E, an end view of removable card holder 102 is illustrated where the lengths of removable cards (not shown) positioned in removable card holder 102 may be aligned into and out of the page. When so positioned, the electrical contacts of the removable cards may be positioned on the left side of the page and the edges may be positioned on the right side of the page, as will be discussed in more detail below.

Removable card holder 102 may secure the edges of removable cards having a variety of different geometries. To do so, removable card holder 102 may include complementary electrical contacts 140, enclosure 146, extension 142, and retention element 144. Each of these components is discussed below.

Complementary electrical contacts 140, as discussed above, may facilitate the formation of operable connections between removable cards and other components while the removable cards are positioned in removable card holder 102. Complementary electrical contacts 140 may be capable of forming an electrical connection with electrical contacts of a removable card positioned in removable card holder 102. While illustrated in FIG. 1E as including three complementary electrical contacts 140, removable card holders may include different numbers of complementary contacts without departing from embodiments disclosed herein.

Complementary electric contacts 140 may conform to a standard such as the PCIe standard (or other type of standard). Likewise, the electrical contacts of removable cards may also conform to a similar standard. The standard may presume a certain degree of alignment between the electrical contacts and the complementary electrical contacts. If the degree of alignment is not met, undesired electrical connections may be formed.

Retention element 144 may be implemented with a physical structure for maintaining alignment of a removable card positioned in removable card holder 102. Retention element 144 may do so by maintaining positioning of an edge of a card holder. Retention element 144 may be adaptable to interface with a variety of profiles of edges of removable cards, discussed with respect to FIGS. 1C-1D. By doing so, different cards having different edge profiles may be positioned in removable card holder 102, thereby improving the likelihood of desirable electrical connections to be formed between the contacts of removable cards and complementary electrical contacts 140.

Extension 142 may be a physical structure that allows retention element 144 to be positioned with respect to removable cards positioned in removable card holder 102. For example, extension 142 may be implemented with a structural member that extends from a top side of enclosure 146. In an embodiment, extension 142 is movable with respect to enclosure 146 so that the distances between complementary electrical contacts 140 and corresponding retention elements (e.g., 144) may be adjusted. For example, the distances may be increased while removable cards are being inserted into removable card holder 102 and the distances may be decreased once the removable cards are inserted (e.g., thereby causing retention elements to come into contact with edges of removable cards.

Enclosure 146 may be a physical structure that bounds a volume in which removable cards may be positioned in removable card holder 102. Enclosure 146 may include walls and/or other types of structural members. The other components of removable card holder 102 may be attached to enclosure 146 and thereby allow for positioning of the other components with respect to one another. The structural members of enclosure 146 may also provide a degree of physical protection to removable cards positioned in the volume. The structural members may cover all, or a portion, of the surface of the volume.

While illustrated in FIG. 1E with a limited number of specific components, a removable card holder may include additional, fewer, and/or different components without departing from embodiments disclosed herein.

Figure 1F:
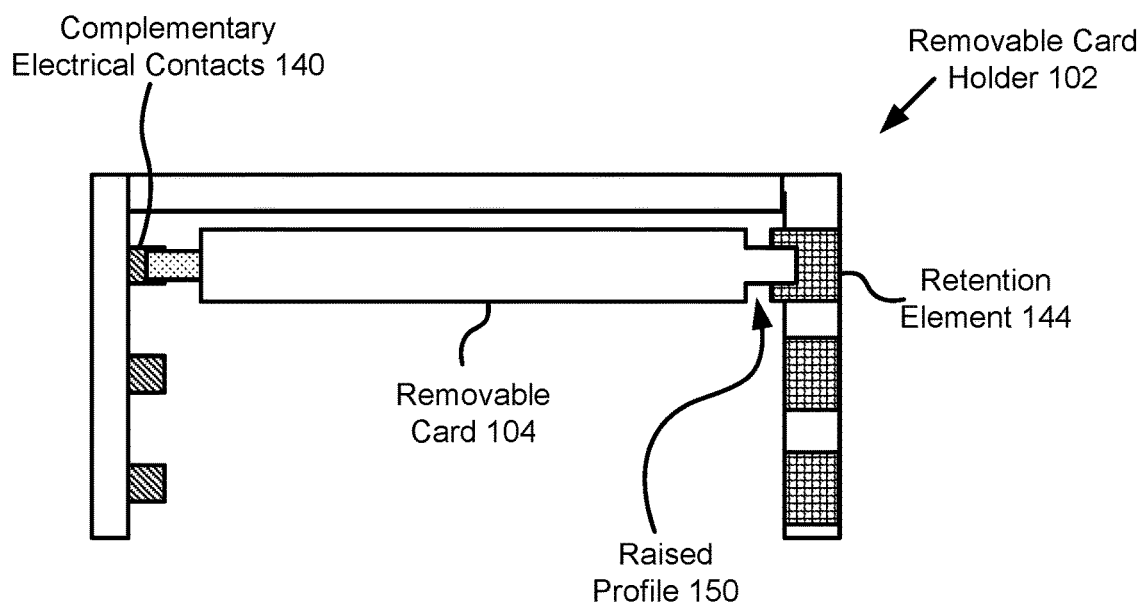
FIG. 1F shows a side view diagram illustrating a removable card holder and removable card in accordance with an embodiment.

Turning to FIG. 1F, a diagram of removable card holder 102 with a removable card 104 positioned therein in accordance with an embodiment is shown. As seen in FIG. 1F, removable card 104 may include an edge having a raised profile 150. To secure the edge, retention element 144 may be implemented in a manner that allows it to adapt its shape to the raised profile. For example, as seen in FIG. 1F, a portion of retention element 144 may extend away from extension 142 and toward complementary electrical contacts 140 to form a slot. The slot may have a shape that is complementary to raised profile 150. Consequently, the slot of retention element 144 may reduce the likelihood that the edge of removable card 104 move towards or away from complementary electrical contacts 140 and/or upward or downward on the page of FIG. 1F (which may cause electrical contacts of removable card 104 to become misaligned with complementary electrical contacts 140). For additional details regarding retention element 144, refer to FIGS. 1H-1O.

Figure 1G:
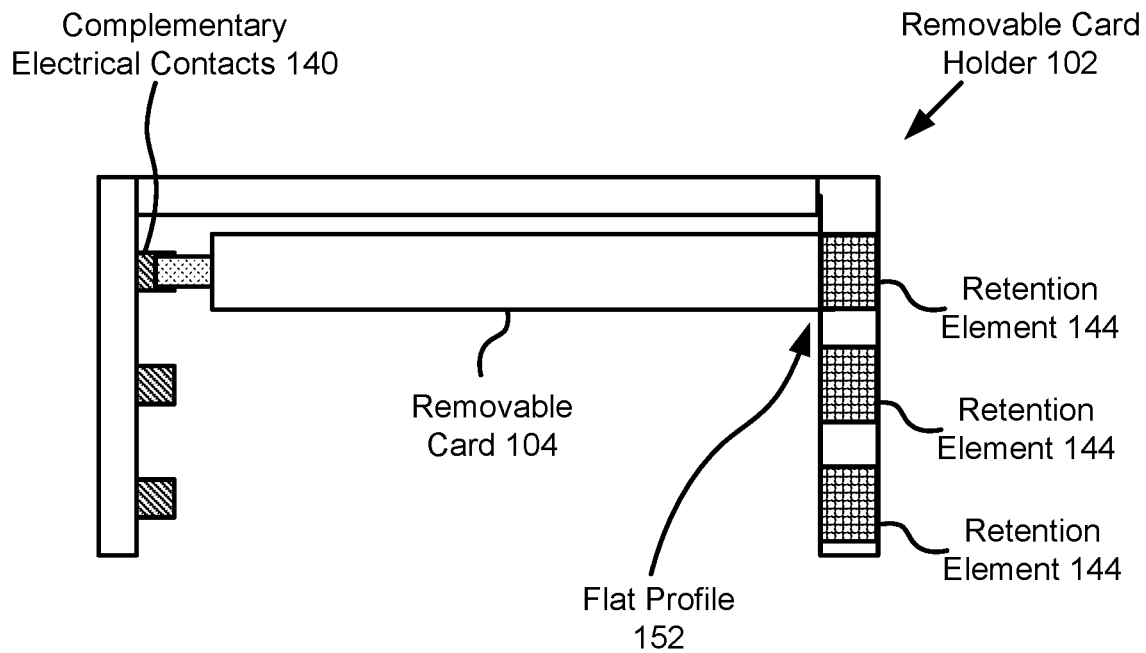
FIG. 1G shows a side view diagram illustrating a removable card holder and removable card in accordance with an embodiment.

Turning to FIG. 1G, a second diagram of removable card holder 102 with removable card 104 positioned therein in accordance with an embodiment is shown. As seen in FIG. 1G, removable card 104 may include an edge having a flat profile 152. To secure the edge, retention element 144 may be implemented in a manner that allows it to adapt its shape to the flat profile. For example, as seen in FIG. 1G, retention element 144 may retract any portions of it that are extended away from extension 142 thereby forming a surface which is complementary to flat profile 152. Consequently, the surface of retention element 144 may reduce the likelihood that the edge of removable card 104 move towards or away from complementary electrical contacts 140.

As noted above, retention element 144 may be adapted such that it may secure edges of removable cards having varying profiles. FIGS. 1H-1O show diagrams illustrating retention elements in accordance with embodiments that may provide for such adaptability.

Figure 1H:
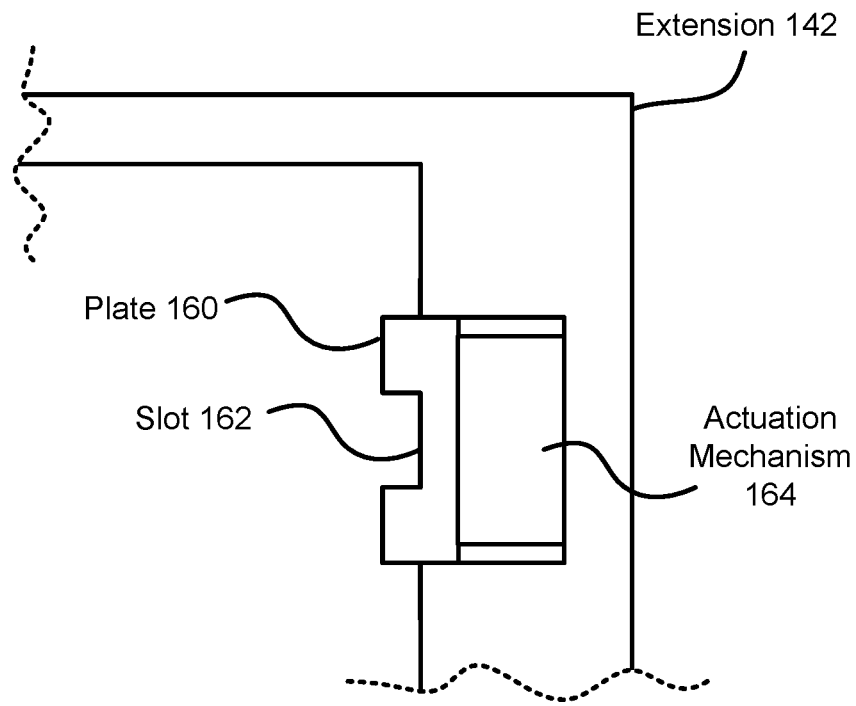
FIG. 1H shows a side view diagram illustrating a retention element of a removable card holder in accordance with an embodiment.

Turning to FIG. 1H, a diagram of a portion of a removable card holder in accordance with an embodiment is shown. FIG. 1H may be oriented similarly to FIGS. 1E-1G.

The removable card holder may include plate 160 positioned on an interior side of extension 142. Plate 160 may include one or more features that allow it to secure edges of removable cards that have varying features.

For example, plate 160 may include slot 162. Slot 162 may allow portions of an edge of a removable card to be surrounded on multiple sides by plate 160. Consequently, plate 160 may restrict movement of a removable card in multiple directions, as discussed with respect to FIG. 1F.

Plate 160 may also include flat portions (e.g., above and below slot 162 in FIG. 1H) proximate to slot 162 to allow for securing of edges having flat profiles rather than varied profiles. In such scenarios, slot 162 may not contribute to the securing of the edge of a removable card. Rather, the flat portions of plate 160 proximate to slot 162 may secure the edges of removable cards.

Depending on the profile a removable card, plate 160 may need to be closer to or farther away from complementary electrical contacts of the removable card holder. For example, removable cards having flat profiles may require that plate 160 be further away while other removable cards having profiles with raised edges may require that plate 160 be closer to the complementary contacts.

To position plate 160, the removable card holder may include actuation mechanism 164. Actuation mechanism 164 may facilitate repositioning of plate 160. Repositioning of plate may allow for removable cards of variable edge geometry to be secured in removable card holder without damaging, misalignment, or other undesired effects due to forces applied by retention elements used to secure the removable cards. Actuation mechanism 164 may facilitate positioning of plate 160 with respect to complementary electrical contacts of the removable card holder.

Figure 1I:
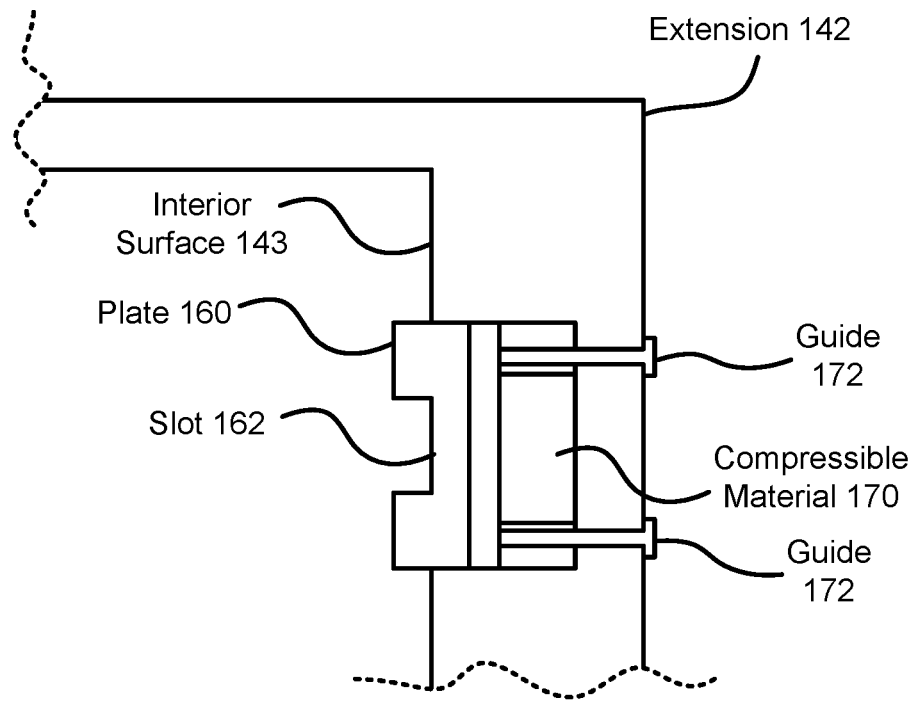
FIG. 1I shows a side view diagram illustrating a retention element of a removable card holder in accordance with an embodiment.
Figure 1J:
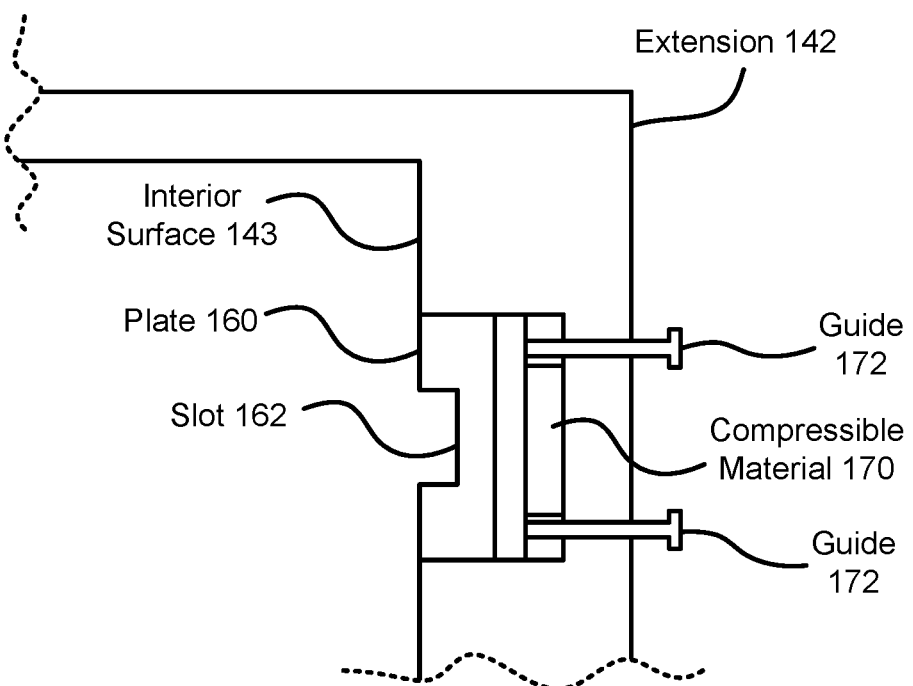
FIG. 1J shows a side view diagram illustrating a retention element of a removable card holder in accordance with an embodiment.

The positioning may be facilitated automatically, or may be utilize intervention by a person to position plate 160. To position plate 160 automatically, actuation mechanism 164 may be implemented with a pressure sensitive return mechanism. The pressure sensitive return mechanism may automatically position plate 160 closer to the complementary contacts unless a sufficient quantity of pressure is applied to plate 160. However, if the sufficient pressure is applied to the flat portions (and/or other portions) of plate 160 proximate to slot 162 (such as in a scenario in which an edge of a removable card has a flat profile), then the pressure sensitive return mechanism may allow plate 160 to move away from the complementary electrical contacts. Refer to FIGS. 1I-1J for additional details regarding automatic positioning of plate 160.

Figure 1K:
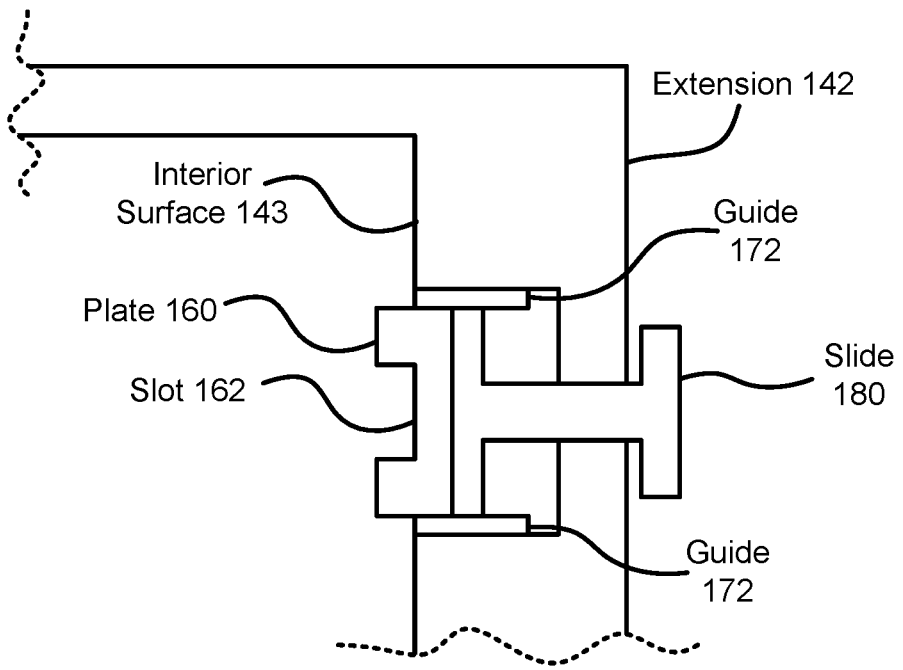
FIG. 1K shows a side view diagram illustrating a retention element of a removable card holder in accordance with an embodiment.
Figure 1L:
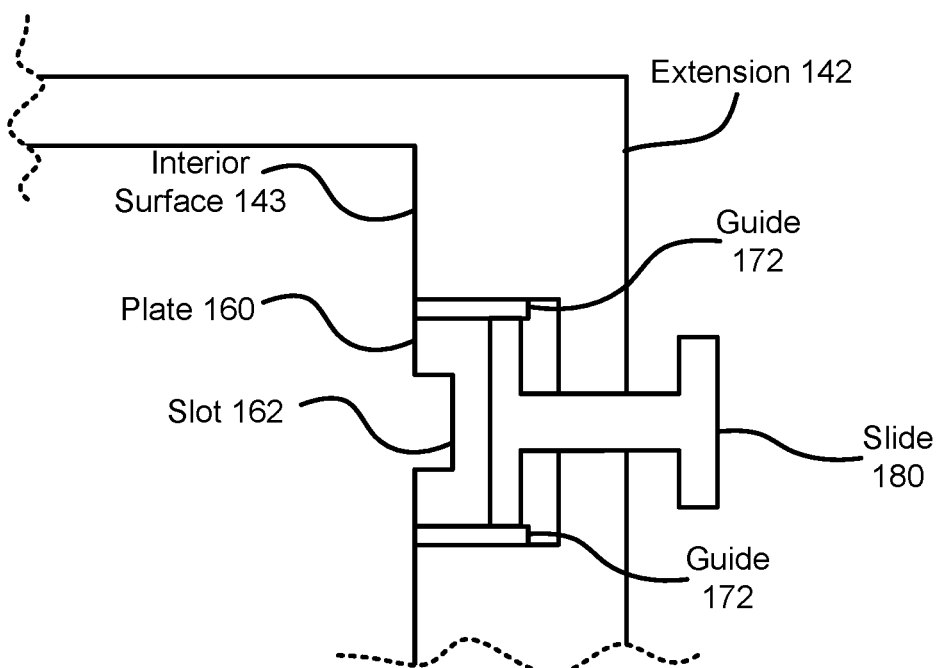
FIG. 1L shows a side view diagram illustrating a retention element of a removable card holder in accordance with an embodiment.

To position plate 160 via intervention, actuation mechanism 164 may include one or more features that allow a person to manually position plate 160 in different locations (e.g., closer to or farther away from the complementary electrical contacts). For example, actuation mechanism 164 may include level, sliders, and/or other features that allow a person to apply pressure to actuation mechanism 164 which moves plate 160 between different positions. Refer to FIGS. 1K-1L for additional details regarding positioning of plate 160 via user intervention.

Turning to FIGS. 1I-1J, diagrams of a removable card holder in accordance with an embodiment are shown. FIGS. 1I-1J may be oriented similarly to FIG. 1H. As discussed above, in one or more embodiments, removable card holder facilitates automatic positioning of plate 160. To facilitate automatic positioning of plate 160, the removable card holder may include one or more of guide 172 and compressible material 170, which may act as an actuation mechanism for plate 160.

Compressible material 170 may be implemented with a volume of material such as a foam or other material that tends to expand to a shape (e.g., when not compressed by applied force). For example, compressible material 170 may be implemented as a sheet or other shape that may be positioned between plate 160 and extension 142. The sheet may have a shape (e.g., thickness) that, when in an expanded configuration, positions plate 160 and slot 162 to interface with a raised element on a removable card positioned in the removable card holder. If pressure is applied to plate 160 (e.g., directed toward extension 142), then compressible material 170 may compress (e.g., to a compressed configuration) thereby allowing plate 160 to move away from complementary electric contacts. In FIG. 1I, compressible material 170 is illustrated in an example uncompressed shape and in FIG. 1J compressible material 170 is illustrated in an example compressed shape (e.g., if pressure is applied to plate 160, which may occur due to a removable card). Compressible material 170 may have other compressed and uncompressed shapes without departing from embodiments disclosed herein.

When compressible material 170 transitions between the compressed and uncompressed shapes, plate 160 may move towards or away from extension 142. To manage the movement path of plate 160, any number of guides (e.g., 172) may be positioned with plate 160 and/or extension 142.

For example, any number of guides (e.g., 172) may limit the travel of plate 160. The guides may do so via any method such as by limiting motion of the plate 160 in some directions.

In an embodiment, guides 172 are implemented using guide pins attached to plate 160. The guides may include a tubular member that extends from plate 160. Extension 142 may include holes or other features through which the guides may traverse. When positioned in the holes through extension 142, the guides may limit movement of plate 160 (e.g., towards and away from extension 142, while maintaining alignment with a depression, recess, and/or other structure of extension 142 in which compressible material 170 is positioned).

Guides may include a head and/or other features for limiting travel of the guides. For example, the heads may be positioned on a side of extension 142 opposite of plate 160. The heads of guides may restrict the distance plate 160 may travel away from extension 142.

As seen in FIGS. 1I-1J, compressible material 170 may allow for plate 160 to move towards or away from extension 142. Consequently, in one position, a portion of plate 160 may extend above interior surface 143 of extension 142. When moved towards extension 142 and into the second position, plate 160 may be recessed (in part or entirely) below interior surface 143. Plate 160 may transition between these two positions automatically without requiring that a user directly interact with the actuation mechanism.

Turning to FIGS. 1K-1L, diagrams of a removable card holder in accordance with an embodiment are shown. FIGS. 1K-1L may be oriented similarly to FIG. 1H. As discussed above, in one or more embodiments, removable card holder facilitates positioning of plate 160 via user intervention. For example, a user may apply pressure to an actuation mechanism coupled to plate 160 to cause plate 160 to move between positions.

To facilitate positioning of plate 160 via user intervention, the removable card holder may include one or more of slide 180 and guide 172, which may act as an actuation mechanism for plate 160.

Figure 1M:
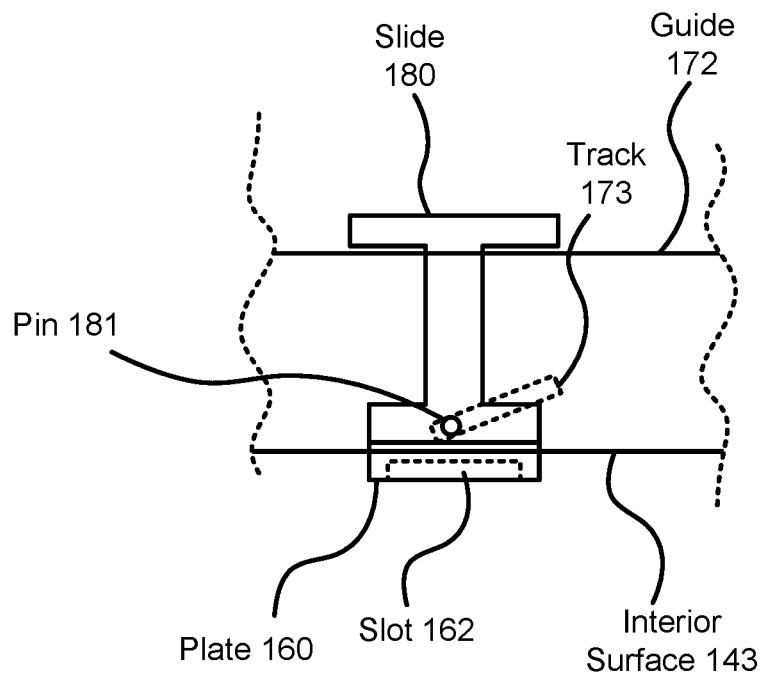
FIG. 1M shows a side view diagram illustrating a retention element of a removable card holder in accordance with an embodiment.
Figure 1N:
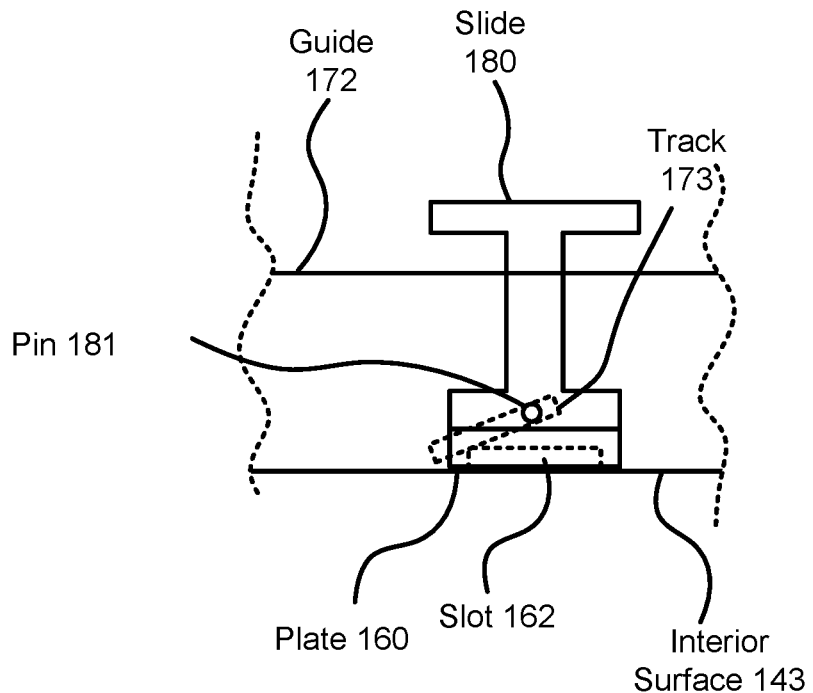
FIG. 1N shows a side view diagram illustrating a retention element of a removable card holder in accordance with an embodiment.
Figure 1O:
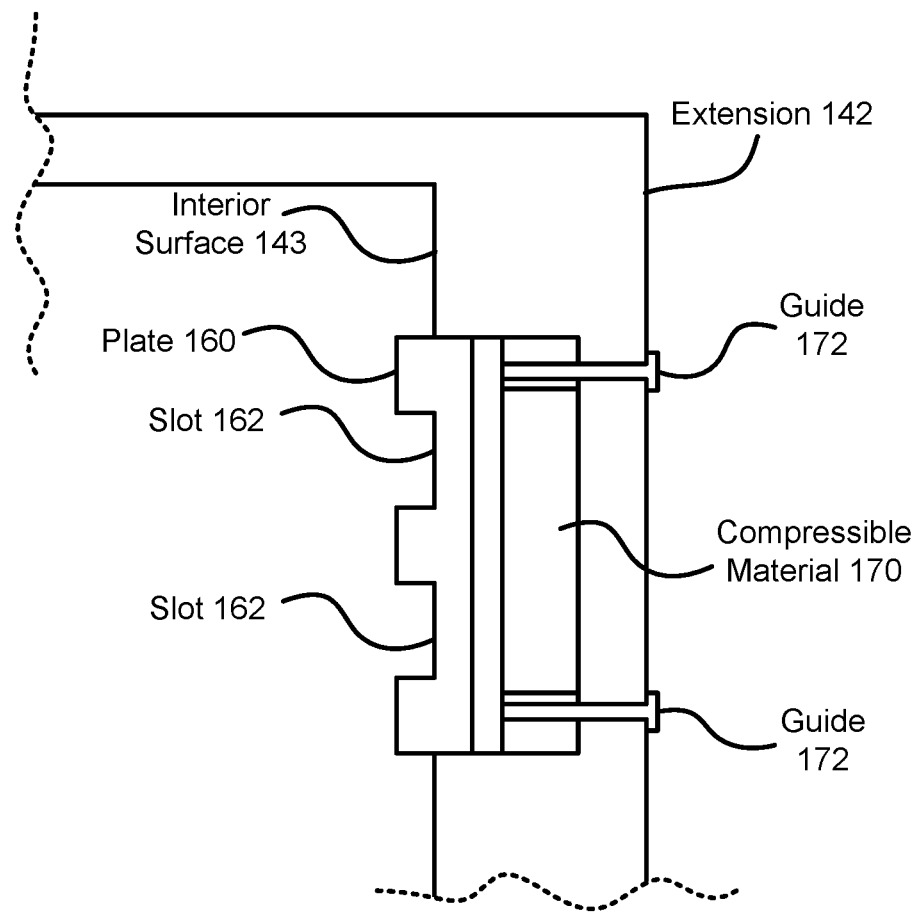
FIG. 1O shows a side view diagram illustrating a retention element of a removable card holder in accordance with an embodiment.

In contrast to the actuation mechanism shown in FIGS. 1I-1J, the actuation mechanism in FIGS. 1K-1L may rely on user intervention to change the position of plate 160. To change the position of plate 160, a user may apply pressure to slide 180. For example, pressure may be applied to the portion of slide to the right of extension 142 in FIGS. 1K-1L. The pressure may be applied into or out of the page. Slide 180 may be coupled to guide 172 which may include a slot, track, or other structure (not shown) that moves slide 180 to the left or to the right in FIGS. 1L-1K when pressure into or out of the page is applied. Slide 180 may be coupled to guide 172 via, for example, a portion of slide 180 being positioned in the slot of guide 172. Refer to FIGS. 1M-1O for additional details regarding coupling between slide 180 and guide 172 and use of the coupling to guide movement of plate 160 when pressure is applied to slide 180.

Slide 180 may be implemented with, for example, a tubular member that connects to plate 160 and extends through extension 142 via a hole or other feature. On the side opposite of the interior surface 143, slide 180 may include a plate or other structure to which a user may apply pressure to move plate 160. Applying pressure in a first direction may cause plate 160 to move away from extension 142 and/or toward complementary electrical contacts, while applying pressure in a second direction may cause plate 160 to move toward extension 142 and/or away from complementary contacts.

Guide 172 may be implemented with, for example, one or more plates. The plates may include tracks or other structures for guiding slide 180 when pressure is applied to slide 180. For example, guide 172 may include a track in which a pin or other portion of slide may be positioned that may guide the movement of slide 180 when pressure is applied to slide 180. As seen in FIGS. 1K-1L, an actuation mechanism may include multiple guides which may be positioned with respect to slide 180. For example, a pair of guides may be positioned on opposite side of slide 180.

In an embodiment, guide 172 is positioned in a depression in interior surface 143 (e.g., in which slide 180 and plate 160 may be partially positioned). Guide 172 may be positioned elsewhere without departing from embodiments disclosed herein.

While actuation mechanisms of removable card holders have been illustrated in FIGS. 1I-1L as including specific components in a specific topology, a removable card holder in accordance with embodiments disclosed herein may include different, fewer, and/or additional components in similar or different topologies.

Turning to FIGS. 1M-1N, a side view diagram illustrating a portion of a removable card holder in accordance with an embodiment is shown. More specifically, these figures may illustrate a portion of the actuation mechanism similar to that shown in FIGS. 1K-1L. The illustrated actuation mechanisms may rely on user intervention to move plate 160 between multiple positions. The views shown in FIGS. 1M-1N may be looking towards an end of the actuation mechanism on which guide 172 is positioned. In these figures, guide 172 may obscure the view of portions of slide 180 by virtue of being in front of slide 180 and plate 160. However, the outlines of slide 180 and plate 160 are shown in these figures to illustrate the operation of these components.

To control the movement of plate 160, guide 172 may include track 173 in which a pin 181 of slide 180 may be positioned. Track 173 may limit the movement of pin 181. In these figures, Track 173 is illustrated as having a specific shape which may define a limited movement path for pin 181. However, track 173 may have different shapes without departing from embodiments disclosed herein. For example, rather than being implemented as a straight slot, track 173 may be curved or have more complex features (e.g., serpentine paths) to manage the movement of plate 160.

When pressure is applied to slide 180 (e.g., at the top portion of slide 180 in FIGS. 1M-1N, which may be on a side of an extension (not shown) opposite of plate 160), slide 180 may move in the direction of applied force. However, pin 181 and track 173 may restrict this motion to a predefined path. Consequently, application of force to slide 180 may only allow slide 180 and attached plate 160 to move between a finite number of predetermined positions.

As seen in FIG. 1M, in one of the positions a portion (or all) of plate 160 and slot 162 may extend beyond interior surface 143. In contrast, as seen in FIG. 1N, in another position plate 160 and slot 162 may be retracted (in part or entirely) below interior surface 143. Consequently, the retention mechanism of a removable card holder may be able to adapt its shape to complement an edge of a removable card. By doing so, a removable card holder may be able to secure various removable cards having different edge geometries.

While a retention mechanism has been illustrated in FIGS. 1E-1N as including a single slot or otherwise only be usable to secure a corresponding removable card, a retention mechanism may include multiple slots and/or other features to securing multiple removable cards.

Turning to FIG. 1O, a diagram of a multi-removable card retention mechanism of a removable card holder in accordance with an embodiment is shown. FIG. 1O may be oriented similarly to FIG. 1H. As seen in FIG. 1O, plate 160 may include multiple slots 162 which may each respectively secure a removable card if corresponding removable cards are positioned in a removable card holder. In this manner, multiple removable cards may be secured using a single retention mechanism.

Figure 2:
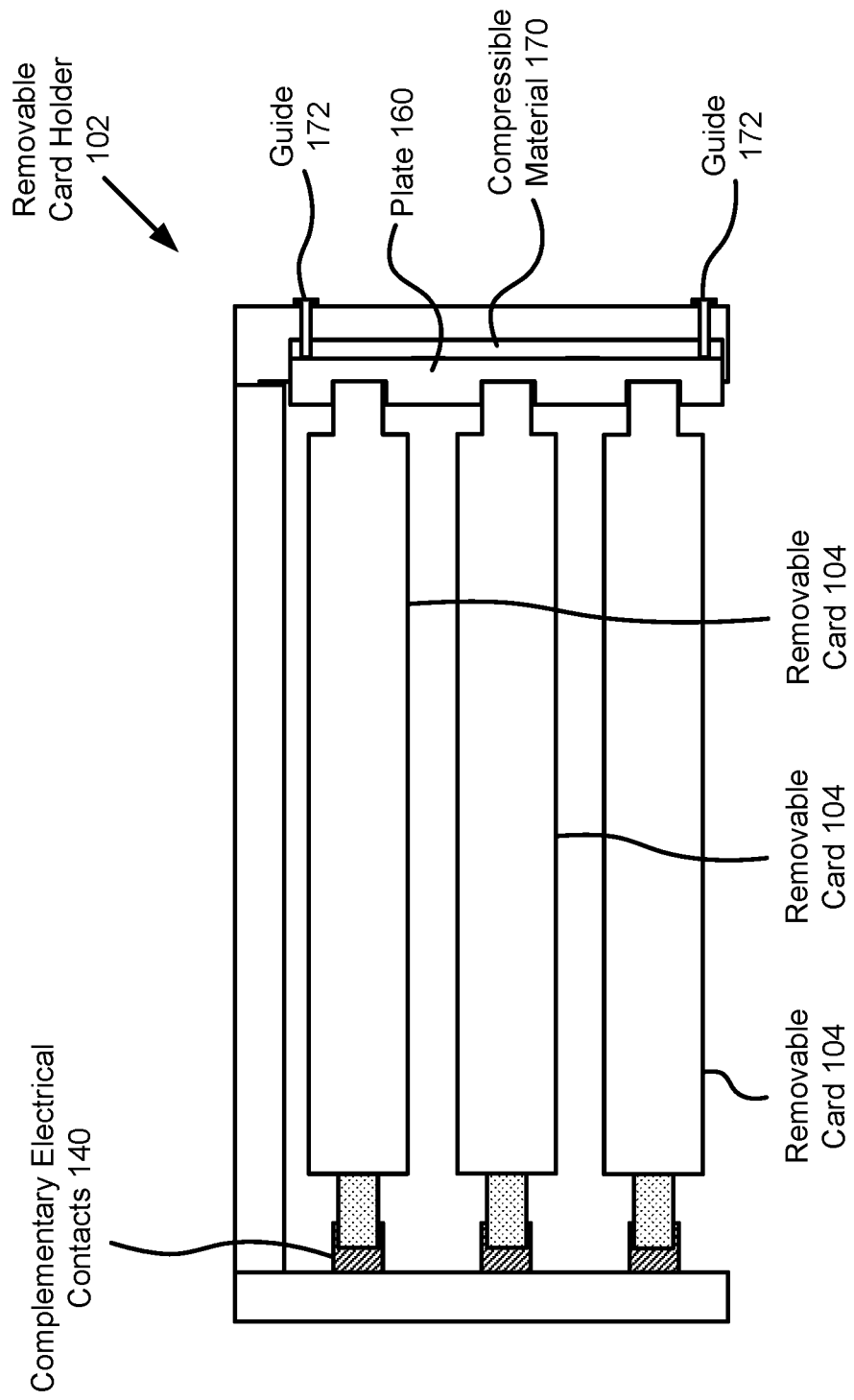
FIG. 2 shows a side view diagram illustrating removable card holder and multiple removable cards in accordance with an embodiment.

For example, consider a scenario as illustrated in FIG. 2, which illustrates a diagram of removable card holder 102 in accordance with an embodiment. As seen in FIG. 2, removable card holder 102 may be populated with three removable cards (e.g., 104). The retention mechanism of removable card holder 102 may include plate 160 which includes multiple slots for securing edges having profiles with raised portions. The use of a single (or reduced number from that of the number of removable cards) retention mechanism may simplify the process of securing removable cards.

Figure 3:
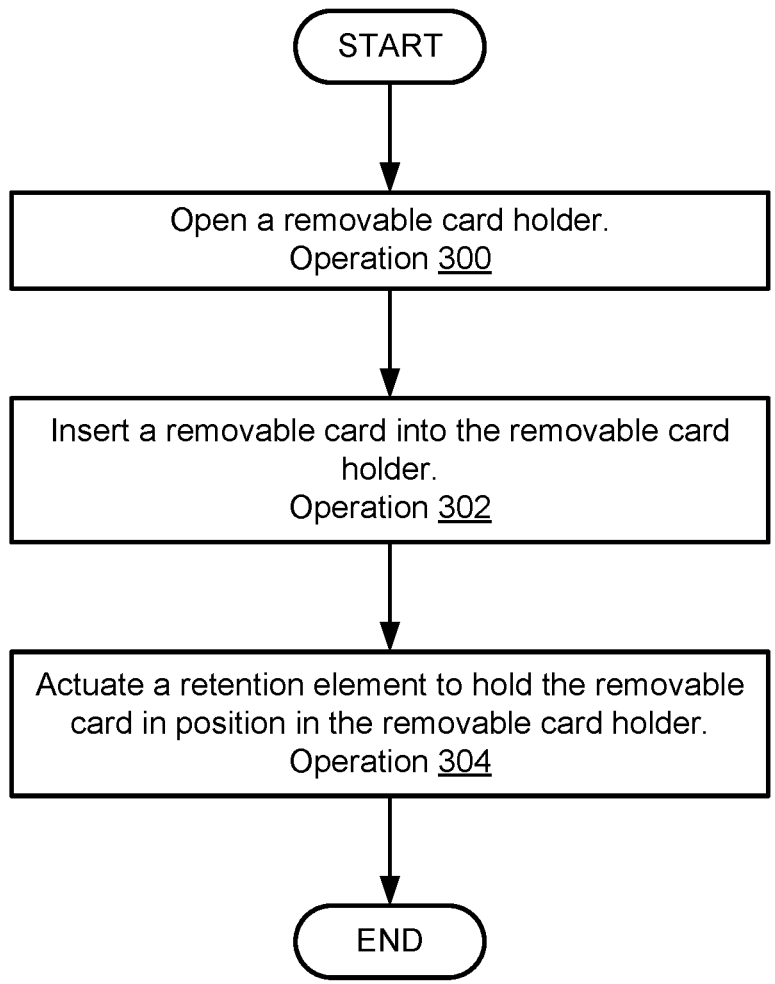
FIG. 3 shows a flow diagram illustrating a method of securing a removable card in a removable card holder in accordance with an embodiment.

Turning to FIG. 3, a flow diagram illustrating a method of securing a removable card in a removable card holder in accordance with an embodiment is shown.

At operation 300, a removable card holder may be opened. Opening the removable card holder may facilitate placement of a removable card in the removable card holder. Opening removable card holder may change its shape to facilitate insertion of removable cards. The removable card holder may be inserted via application of force.

For example, turning to FIG. 4A which illustrates a diagram of removable card holder 102 in accordance with an embodiment disclosed herein, removable card holder 102 may be opened by applying force to extension 142. In FIG. 4A, the force is illustrated by the oversized arrow.

Applying the force may cause extension 142 to move away from complementary electrical contacts 140. When so moved, removable cards may be inserted into enclosure 146 and seated onto complementary contacts.

Figure 4B:
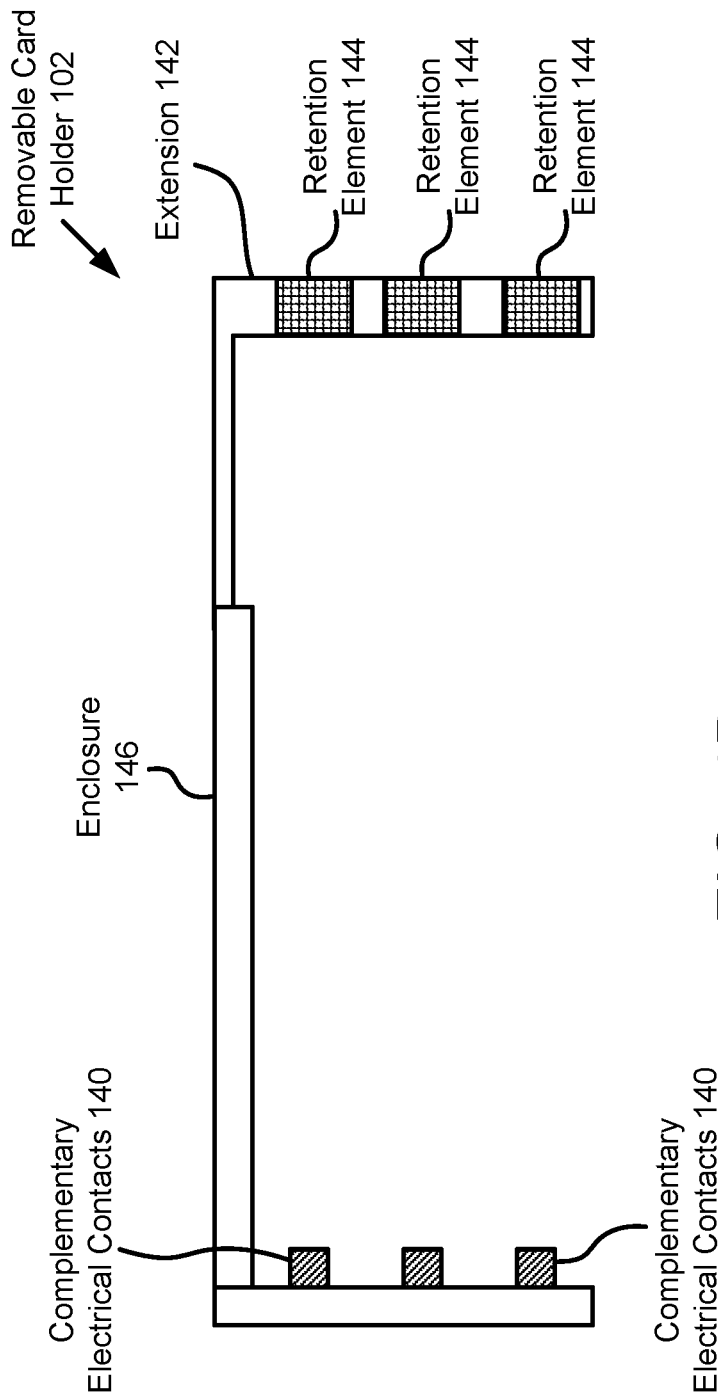

For example, turning to FIG. 4B which illustrates a second diagram of removable card holder 102 after application of the force in accordance with an embodiment, the applied force may modify the position of extension 142. As seen in FIG. 4B, extension 142 may be positioned farther away from complementary electrical contacts 140 thereby allowing for insertion of removable cards.

While illustrated and described with respect to FIGS. 4A-4B with respect to translation of extension 142, removable card holder 102 may be opened via rotation of extension 142 or other changes in the size, shape, and/or topology of removable card holder 102.

Returning to the discussion of FIG. 3, at operation 302, a removable card is inserted into the removable card holder. The removable card may be inserted into an interior of an enclosure of the removable card. When inserted, the electrical contacts of the removable card may be operably connected to the complementary electrical contacts of the removable card holder.

Figure 4C:
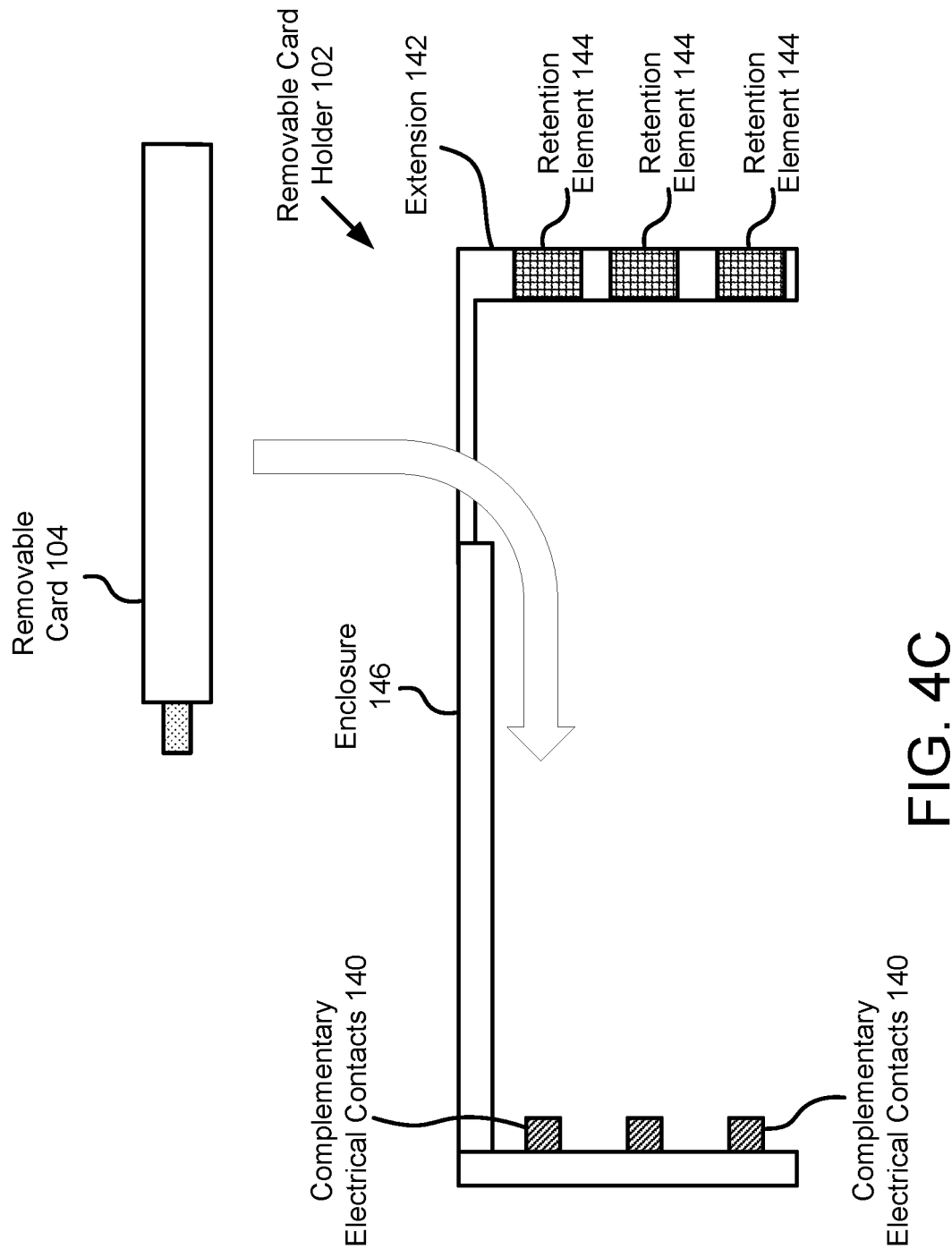

For example, turning to FIG. 4C which illustrates a third diagram of removable card holder 102 in accordance with an embodiment, in which removable card 104 may be inserted into enclosure 146 by virtue of the increased spacing between complementary electrical contacts 140 and retention element 144. For example, a person may move removable card into enclosure 146 and place the electrical contacts of removable card 104 in contact with complementary electrical contacts 140.

Figure 4D:
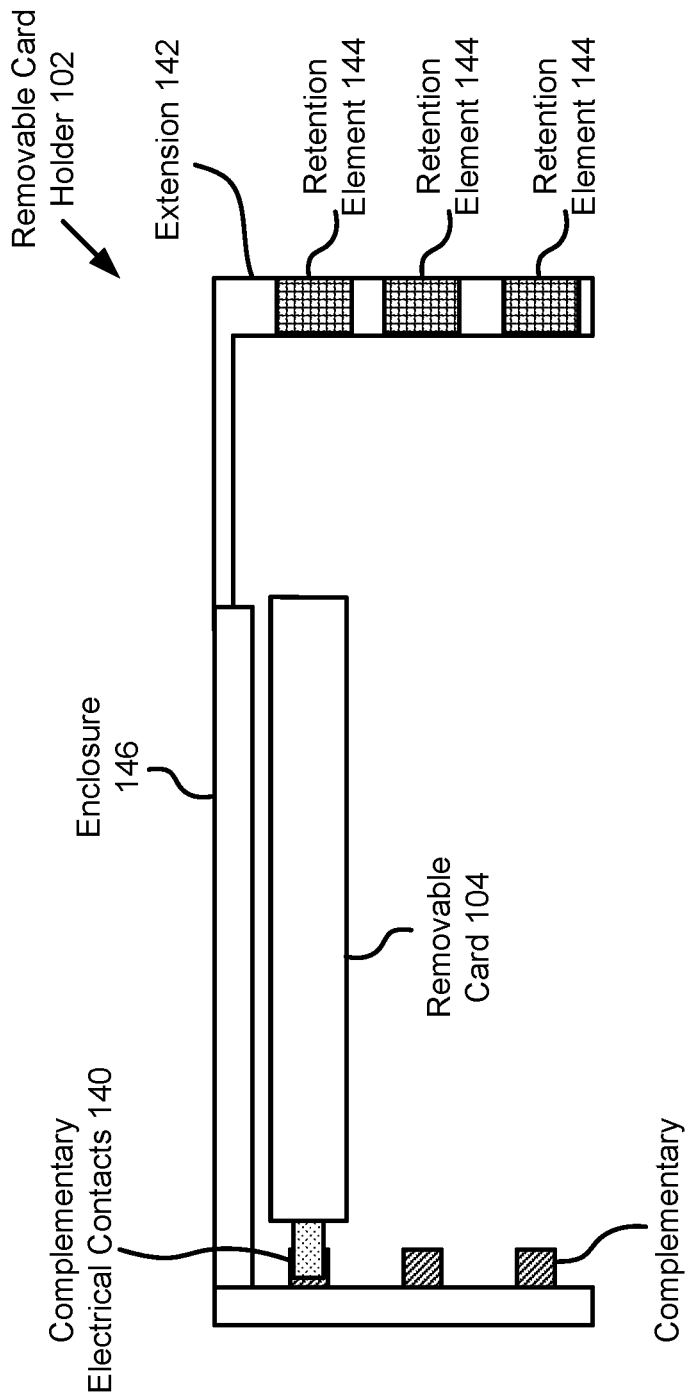

For example, turning to FIG. 4D which illustrates a fourth diagram of removable card holder 102 in accordance with an embodiment, in which removable card 104 has been inserted into enclosure 146. As seen in FIG. 4D, when so inserted the end of removable card 104 positioned away from complementary electrical contacts 140 may not be supported until retention element 144 secures that end. Consequently, if left unsecured, removable card 104 may move, deform, etc. in a manner that may cause intermittent electrical contact issues or undesirable contact between the electrical contacts of removable card and complementary electrical contacts 140.

Returning to the discussion of FIG. 3, at operation 304, a retention element is actuated to hold the removable card in the removable card holder. The retention element may be actuated by (i) closing the removable card holder and/or (ii) automatic actuation or manual actuation by user intervention of the retention element.

Figure 4E:
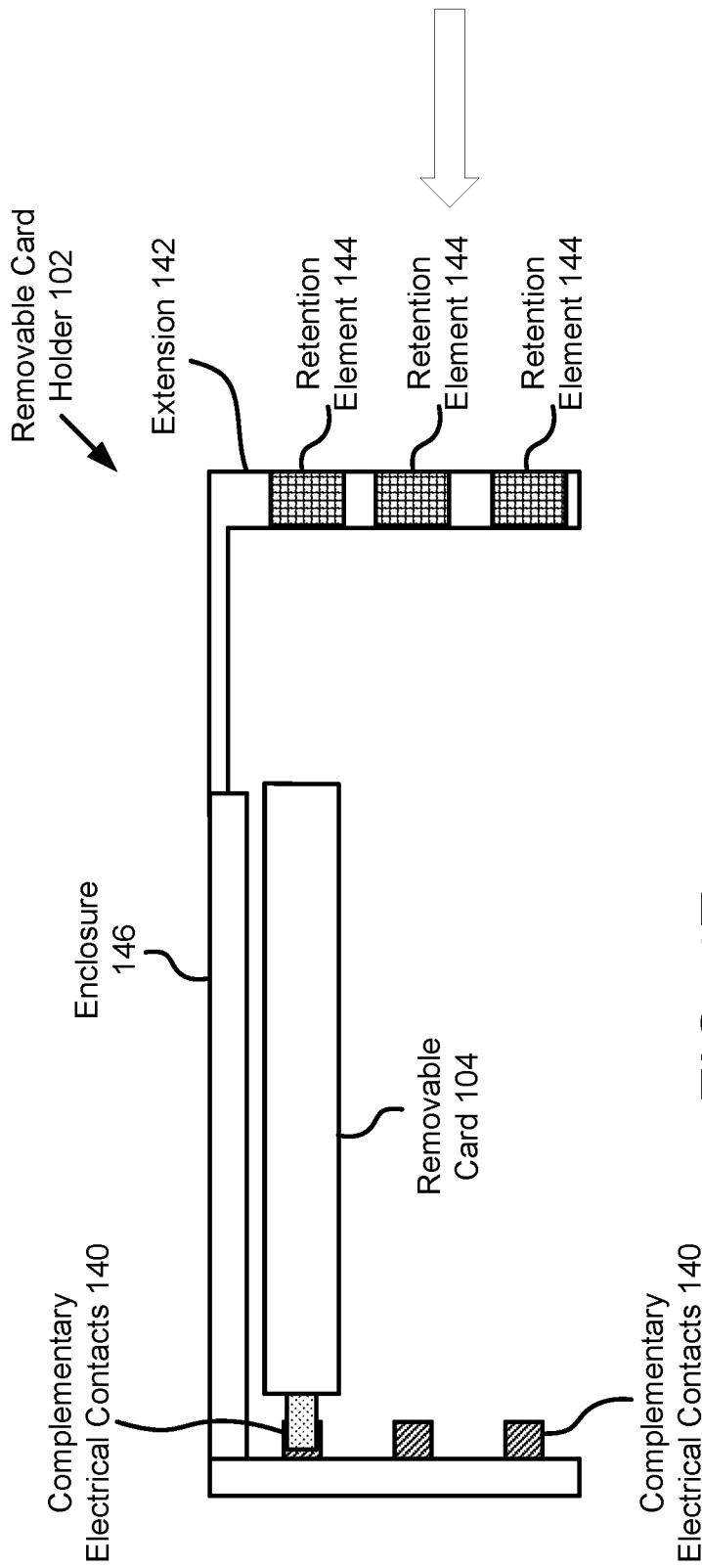

For example, turning to FIG. 4E which illustrates a fifth diagram of removable card holder 102 in accordance with an embodiment, in which removable card 104 may be closed by application of force to extension 142. In FIG. 4E, the force is illustrated by the oversized arrow. Once the force is applied, retention element 144 may be positioned close to the end of removable card 104 proximate to extension 142.

Figure 4F:
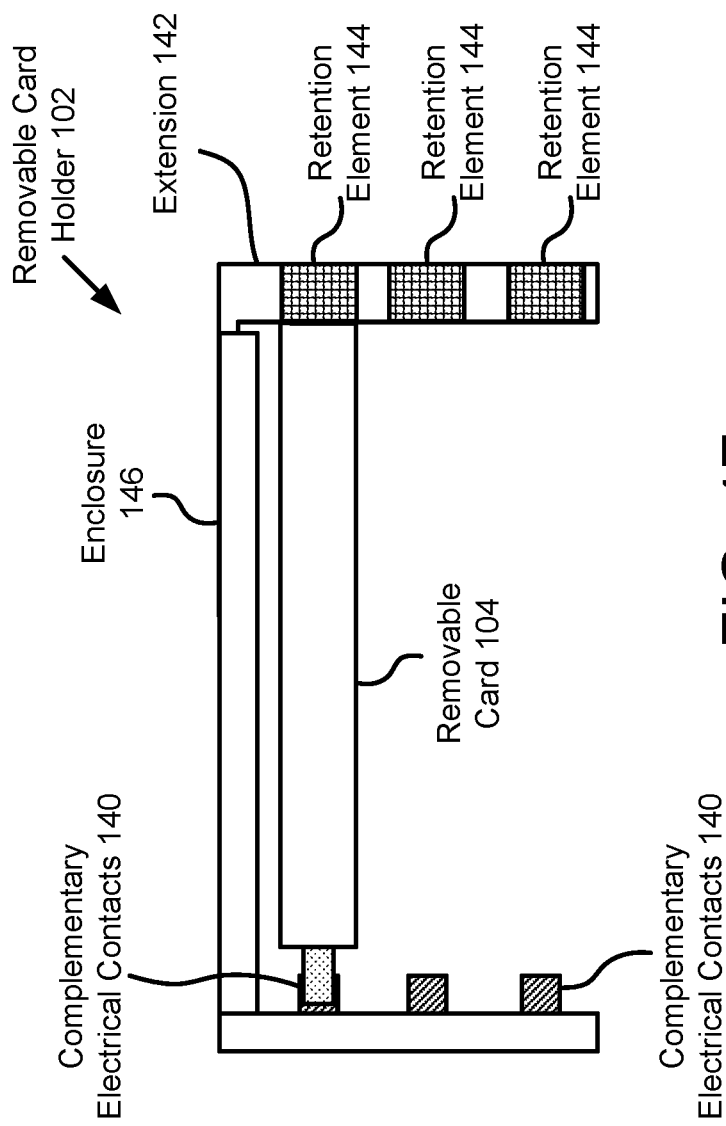

For example, turning to FIG. 4F which illustrates a sixth diagram of removable card holder 102 in accordance with an embodiment, in which extension 142 has been positioned proximate to removable card 104, retention element 144 may automatically or be manually actuated. When so actuated, the end of removable card 104 proximate may be secured.

The actuation of the retention element may depend on the profile of the edge of removable card 104. If the edge of removable card 102 has a flat profile (e.g., as illustrated in FIG. 4F), then retention element may be actuated into a retracted configuration. In contrast, if the edge of removable card 102 has a profile that includes a raised portion, then retention element may be actuated into an extended configuration (e.g., as illustrated in FIG. 1F).

Returning to the discussion of FIG. 3, the method may end following operation 304.

By providing methods, devices, and systems, as discussed above, an improved data processing system may be provided that be less likely to damage components user therein and improve the likelihood of the components maintaining operable connections to one another.

As discussed above, various components may be implemented with computing devices. For example, any of the components illustrated in FIGS. 1-4F may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis (e.g., 110) of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A data processing system, comprising:
  a processor; and
  a removable card holder comprising:
    electrical contacts connected to the processor, the electrical contacts being adapted to contact complementary electrical contacts of a removable card while the removable card is positioned in the removable card holder to form a connection between the processor and the removable card;
    an extension adapted to restrict movement of the removable card away from the electrical contacts while the removable card is positioned in the removable card holder; and
    a retention element positioned with the extension, the retention element adapted to:
      engage an edge of the removable card when the removable card comprises the edge and the extension restricts movement of the removable card, and
      retract away from the removable card when the removable card does not comprise the edge.

2. The data processing system of claim 1, wherein the retention element comprises a slot that restricts movement of the removable card while the retention element engages the edge of the removable card.

3. The data processing system of claim 2, wherein the slot restricts movement of the removable card in a first direction, the extension restricts movement of the removable card away from the electrical contacts in a second direction, and the first direction and the second direction are different directions.

4. The data processing system of claim 2, wherein the retention element further comprises a compressible pad positioned between the slot and the extension, the compressible pad being adapted to expand when the removable card comprises the edge and contract when the removable card does not comprise the edge.

5. The data processing system of claim 2, wherein the retention element further comprises a sliding element coupled to the slot, the sliding element being adapted to move the slot between a first position in which the retention element is extended toward the removable card and a second position in which the retention element is retracted away from the removable card.

6. The data processing system of claim 1, wherein the retention element further comprises a second slot that restricts movement of a second removable card while the second slot engages an edge of a second removable card positioned in the removable card holder.

7. The data processing system of claim 1, wherein the edge comprises a portion of circuit card of the removable card, the complementary electrical contacts being positioned on a second portion of the circuit card.

8. The data processing system of claim 1, wherein the extension is movable between two positions, while in a first position of the two positions the extension presses the retention element against the removable card positioned in the removable card holder and while in a second position of the two positions the extension holds the retention element away from the removable card positioned in the removable card holder.

9. The data processing system of claim 8, wherein pressing the retention element against the removable card assists in maintaining contact between the electrical contacts and the complementary electrical contacts.

10. The data processing system of claim 1, wherein the extension comprises a plate, wherein the retention element is moveably coupled to the plate between two positions, in a first position of the two positions the retention element is closer to the electrical contacts than in a second position of the two positions.

11. A removable card holder, comprising:
electrical contacts adapted to contact complementary electrical contacts of a removable card while the removable card is positioned in the removable card holder to form an connection between the removable card and another component connected to the electrical contacts;
an extension adapted to restrict movement of the removable card away from the electrical contacts while the removable card is positioned in the removable card holder; and
a retention element positioned with the extension, the retention element adapted to:
engage an edge of the removable card when the removable card comprises the edge and the extension restricts movement of the removable card, and
retract away from the removable card when the removable card does not comprise the edge.

12. The removable card holder of claim 11, wherein the retention element comprises a slot that restricts movement of the removable card while the retention element engages the edge of the removable card.

13. The removable card holder of claim 12, wherein the slot restricts movement of the removable card in a first direction, the extension restricts movement of the removable card away from the electrical contacts in a second direction, and the first direction and the second direction are different directions.

14. The removable card holder of claim 12, wherein the retention element further comprises a compressible pad positioned between the slot and the extension, the compressible pad being adapted to expand when the removable card comprises the edge and contract when the removable card does not comprise the edge.

15. The removable card holder of claim 12, wherein the retention element further comprises a sliding element coupled to the slot, the sliding element being adapted to move the slot between a first position in which the retention element is extended toward the removable card and a second position in which the retention element is retracted away from the removable card.

16. The removable card holder of claim 11, wherein the retention element further comprises a second slot that restricts movement of a second removable card while the second slot engages an edge of a second removable card positioned in the removable card holder.

17. The removable card holder of claim 11, wherein the edge comprises a portion of circuit card of the removable card, the complementary electrical contacts being positioned on a second portion of the circuit card.

18. The removable card holder of claim 11, wherein the extension is movable between two positions, while in a first position of the two positions the extension presses the retention element against the removable card positioned in the removable card holder and while in a second position of the two positions the extension holds the retention element away from the removable card positioned in the removable card holder.

19. The removable card holder of claim 18, wherein pressing the retention element against the removable card assists in maintaining contact between the electrical contacts and the complementary electrical contacts.

20. The removable card holder of claim 11, wherein the extension comprises a plate, wherein the retention element is moveably coupled to the plate between two positions, in a first position of the two positions the retention element is closer to the electrical contacts than in a second position of the two positions.

* * * * *